(12) United States Patent
Draxler (10) Patent No.: US 12,145,520 B1
(45) Date of Patent: Nov. 19, 2024

(54) SIDE IMPACT GUARD

(71) Applicant: STI Holdings, Inc., Stoughton, WI (US)

(72) Inventor: Thomas James Draxler, Deerfield, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

(21) Appl. No.: 18/474,851

(22) Filed: Sep. 26, 2023

(51) Int. Cl.
| B60R 19/56 | (2006.01) |
| B62D 21/03 | (2006.01) |
| B62D 33/04 | (2006.01) |

(52) U.S. Cl.
CPC ............ B60R 19/565 (2013.01); B62D 21/03 (2013.01); B62D 33/04 (2013.01)

(58) Field of Classification Search
CPC ........ B60R 19/565; B62D 21/03; B62D 33/04
See application file for complete search history.

(56) References Cited

U.S. PATENT DOCUMENTS

| 2,381,529 | A | 8/1945 | Willis |
| 3,081,065 | A | 3/1963 | Dalton |
| 3,089,711 | A | 5/1963 | Tantlinger et al. |
| 3,253,839 | A | 5/1966 | Warren |
| 3,889,972 | A | 6/1975 | Bredt |
| 4,060,268 | A | 11/1977 | Page, Jr. |
| 5,921,617 | A | 7/1999 | Loewen et al. |
| 6,558,765 | B2 | 5/2003 | Padmanabhan |
| 6,626,475 | B2 | 9/2003 | Schroeder |
| 6,626,622 | B2 | 9/2003 | Zubko |
| 6,641,206 | B1 | 11/2003 | Bergstrom et al. |

(Continued)

FOREIGN PATENT DOCUMENTS

WO WO-2021064586 A1 * 4/2021 ........... B62D 35/001

OTHER PUBLICATIONS

AirFlow Deflector, "Angel Wing™ Truck Side Guard. Tested by the IIHS to prevent side underride," <https://airflowdeflector.com/angelwing_underride-1/> web page visited May 27, 2020 (4 pages).

(Continued)

*Primary Examiner* — Toan C To
(74) *Attorney, Agent, or Firm* — Michael Best & Friedrich LLP (57) ABSTRACT

A cargo transport comprising a plurality of wheels, a subframe supported by the plurality of wheels, and an underride guard assembly coupled to the subframe. The subframe comprises a road-side longitudinal rail, a curb-side longitudinal rail, and a plurality of cross beams extending between the road-side longitudinal rail and the curb-side longitudinal rail. The underride guard assembly comprises a plurality of brackets coupled to the plurality of cross beams of the subframe, a plurality of resilient sheets coupled to the subframe, a respective reinforcement rail, and a plurality of bracing assemblies. The resilient sheets include a road-side resilient sheet extending below the road-side longitudinal rail and a curb-side resilient sheet extending below the curb-side longitudinal rail. The respective reinforcement rail is coupled at a lower portion of each of the resilient sheets. The bracing assemblies are coupled to the brackets and the respective reinforcement rail.

17 Claims, 11 Drawing Sheets

(56) References Cited

U.S. PATENT DOCUMENTS

| | | |
|---|---|---|
| 6,893,079 B1 | 5/2005 | Johnson et al. |
| 7,077,440 B1 | 7/2006 | Morales et al. |
| 7,086,674 B2 | 8/2006 | Goertz |
| 7,093,889 B2 | 8/2006 | Graham |
| 7,188,875 B2 | 3/2007 | Norelius |
| 7,370,893 B2 | 5/2008 | Tamada et al. |
| 7,407,204 B2 | 8/2008 | Eriksson et al. |
| 7,578,541 B2 | 8/2009 | Layfield et al. |
| 7,686,385 B2 | 3/2010 | Dolan et al. |
| 7,780,224 B2 | 8/2010 | Roush |
| 7,967,349 B2 | 6/2011 | Puppini et al. |
| 8,162,384 B2 | 4/2012 | Giromini et al. |
| 8,210,599 B2 | 7/2012 | Butler |
| 8,366,180 B2 | 2/2013 | Lee et al. |
| 8,579,359 B2 | 11/2013 | Brown et al. |
| 8,678,474 B1 | 3/2014 | Boivin et al. |
| 8,950,793 B2 | 2/2015 | Deighton |
| 8,973,973 B2 | 3/2015 | Kronemeyer |
| 9,138,943 B2 | 9/2015 | Weinberg et al. |
| 9,272,741 B2 | 3/2016 | Gerst |
| 9,352,714 B2 | 5/2016 | Batzer et al. |
| 9,463,759 B1 | 10/2016 | Kiefer |
| 9,487,171 B2 | 11/2016 | Rogers et al. |
| 9,506,488 B2 | 11/2016 | Mancina et al. |
| 9,694,776 B2 | 7/2017 | Nelson et al. |
| 9,751,573 B2 | 9/2017 | Senatro |
| 9,840,219 B2 | 12/2017 | Theethira Kushalappa et al. |
| 9,908,493 B1 | 3/2018 | Kiefer |
| 9,919,749 B2 | 3/2018 | Baker et al. |
| 9,969,445 B2 * | 5/2018 | Persson ................ B62D 35/008 |
| 10,259,414 B2 | 4/2019 | Keane et al. |
| 10,343,636 B2 | 7/2019 | Fortier |
| 10,343,731 B2 | 7/2019 | Emery et al. |
| 10,549,797 B2 | 2/2020 | Ehrlich et al. |
| 10,577,033 B2 | 3/2020 | Macherel et al. |
| 10,632,948 B2 | 4/2020 | Roush et al. |
| 10,940,817 B2 | 3/2021 | Kunkel et al. |
| 10,946,824 B2 | 3/2021 | Kunkel et al. |
| 10,994,791 B2 | 5/2021 | Bradley |
| 11,084,542 B2 * | 8/2021 | Desjardins ............ B60R 19/565 |
| 11,105,125 B2 * | 8/2021 | Jung .................... E05B 63/246 |
| 11,305,713 B2 | 4/2022 | Batzer et al. |
| 11,345,296 B2 | 5/2022 | Ponder |
| 11,548,459 B2 | 1/2023 | Deighton |
| 11,738,704 B2 * | 8/2023 | Lee ........................ B62D 53/06 |
| | | 293/128 |
| 2008/0116702 A1 | 5/2008 | Enz et al. |
| 2017/0129433 A1 | 5/2017 | Keane et al. |
| 2018/0093719 A1 * | 4/2018 | Emery ................. B62D 35/001 |
| 2018/0118143 A1 | 5/2018 | Ponder |
| 2019/0077470 A1 | 3/2019 | Kunkel et al. |
| 2019/0256026 A1 * | 8/2019 | Kunkel ................. B60R 19/565 |
| 2020/0061980 A1 | 2/2020 | Pearson et al. |
| 2020/0269789 A1 | 8/2020 | Ponder |
| 2021/0309176 A1 | 10/2021 | Lee et al. |
| 2022/0009436 A1 | 1/2022 | Watson |
| 2022/0063535 A1 * | 3/2022 | Batzer ................... B60R 19/565 |

OTHER PUBLICATIONS

AirFlow Deflector, "Panel Side Guard Video Gallery," <https://airflowdeflector.com/photo-panel/> web page visited May 27, 2020 (6 pages).

Lockridge, "Should Truck Trailers Have Side Underride Guards?" <https://www.truckinginfo.com/340949/should-truck-trailers-have-side-underride-guards> article dated Sep. 23, 2019 (9 pages).

Wilson, "Wabash prototype: Side underride guard with aero skirt," <https://www.trailer-bodybuilders.com/trailers/article/21742324/wabash-prototype-side-underride-guard-with-aero-skirt> article dated Sep. 29, 2017 (5 pages).

Wabash National, "High-Performance Aerodynamics," <https://www.wabashnational.com/brands/wabash-national/wabash-product-portfolio/trailer-aerodynamics> web page visited May 27, 2020 (7 pages).

* cited by examiner

SIDE IMPACT GUARD

BACKGROUND

The invention relates to over-the-road cargo transports, for example over-the road trailers or straight trucks. The disclosure relates to such cargo transports with a side underride guard assembly to prevent a passenger vehicle or an object from running underneath the cargo transport.

SUMMARY

In one aspect, the disclosure provides a cargo transport comprising a plurality of wheels, a subframe supported by the plurality of wheels, and an underride guard assembly coupled to the subframe. The plurality of wheels is configured to provide movement to the cargo transport along a road in a transportation direction parallel to a longitudinal axis of the cargo transport. The subframe comprises a road-side longitudinal rail, a curb-side longitudinal rail, and a plurality of cross beams extending between the road-side longitudinal rail and the curb-side longitudinal rail. The underride guard assembly comprises a plurality of brackets coupled to the plurality of cross beams of the subframe, a plurality of resilient sheets coupled to the subframe, a respective reinforcement rail, and a plurality of bracing assemblies. The plurality of brackets is located centrally on the plurality of cross beams of the subframe. The plurality of resilient sheets includes a road-side resilient sheet extending below the road-side longitudinal rail and a curb-side resilient sheet extending below the curb-side longitudinal rail. The respective reinforcement rail is coupled to a lower portion of each of the resilient sheets. The plurality of bracing assemblies coupled to the plurality of brackets and the respective reinforcement rail at one the of plurality of resilient sheets.

In another aspect, the disclosure provides an underride guard assembly for use with a cargo transport having a subframe with a plurality of transverse cross beams bisected by a longitudinal axis. The underride guard assembly comprises a plurality of brackets configured for securement to the subframe at the longitudinal axis, a resilient sheet configured for securement to the subframe along one of a roadside or a curb-side thereof, a reinforcement rail coupled to a lower portion of the resilient sheet, and a plurality of bracing assemblies coupled to the plurality of brackets and coupled to the reinforcement rail.

In another aspect, the disclosure provides a cargo transport comprising a plurality of wheels, a subframe supported by the plurality of wheels, an enclosed cargo container coupled to the subframe, a landing gear assembly coupled to the subframe, and underride guard coupled to the subframe. The plurality of wheels are wheels configured to provide movement of the cargo transport along a road in a transportation direction T parallel to a longitudinal axis of the cargo transport. The subframe comprises a road-side longitudinal rail, a curb-side longitudinal rail, a front rail, a rear rail, and a plurality of cross beams extending between the road-side longitudinal rail and the curb-side longitudinal rail and spaced from the front and rear rails. The cargo defines a front end and a rear end including a cargo opening. The landing gear assembly is configured to support a front end of the cargo transport in a stationary configuration. The underride guard assembly is positioned below the enclosed cargo container and between the plurality of wheels and the set of landing gear. Further, the underride guard assembly comprises a plurality of brackets coupled to the plurality of cross beams of the subframe, the plurality of brackets located along the longitudinal axis, a first resilient sheet coupled to the subframe with a first plurality of sheet brackets, a second resilient sheet coupled to the subframe with a second plurality of sheet brackets, and a plurality of bracing assemblies including at least one bracing assembly coupled between the plurality of brackets and the first reinforcement rail and at least one bracing assembly coupled between the plurality of brackets and the second reinforcement rail. The first resilient sheet is located adjacent to the road-side longitudinal rail, and a first reinforcement rail is coupled to a lower portion of the first resilient sheet. the second resilient sheet located adjacent to the curb-side longitudinal rail, and a second reinforcement rail is coupled to a lower portion of the second resilient sheet. Each of the plurality of bracing assemblies comprise a shaft portion rotatably coupled to the plurality of brackets, a plurality of end couplers coupled to one of the first and second reinforcement rails, and a truss structure spanning from the shaft portion to the plurality of end plates.

DETAILED DESCRIPTION

Figure 1:
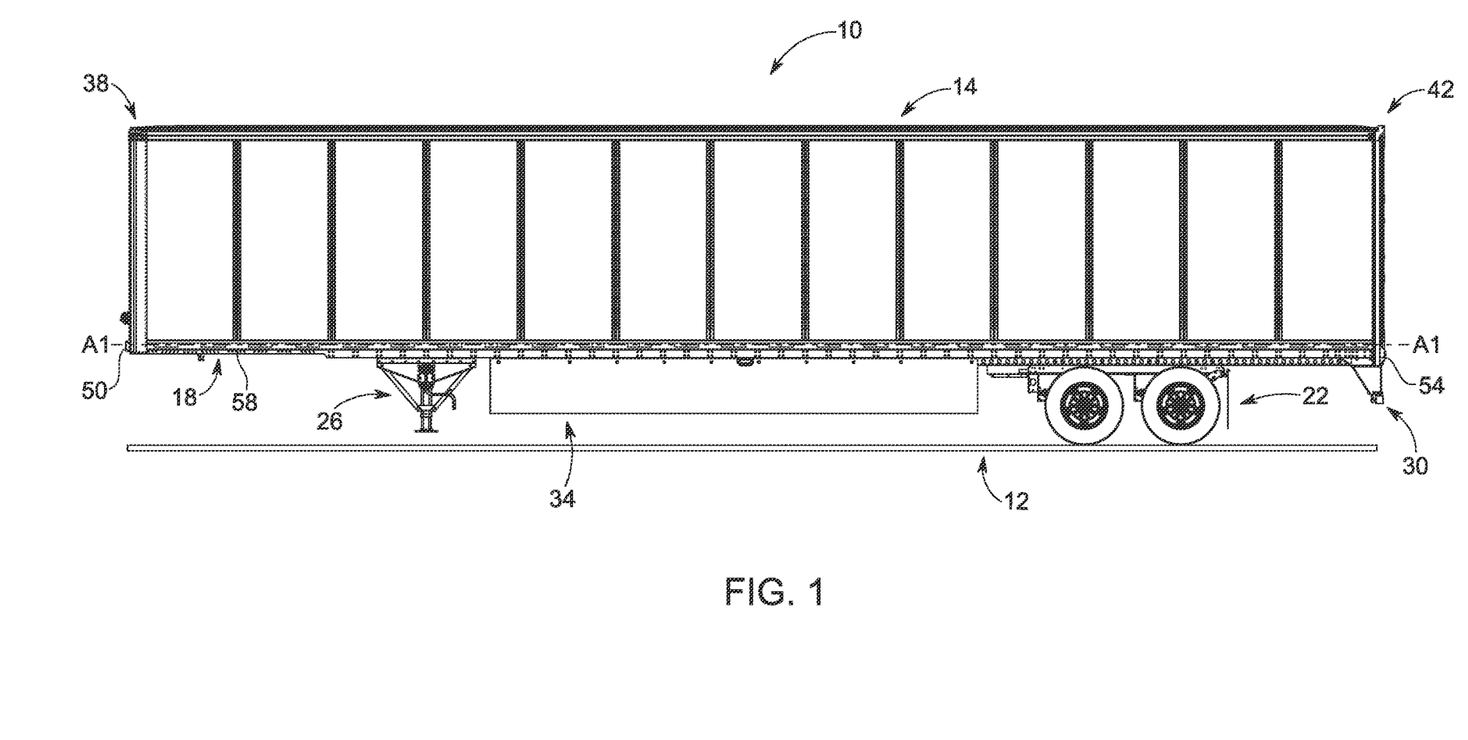
FIG. 1 is a side view of a cargo transport including a side underride guard according to one embodiment of the present disclosure.
Figure 2:
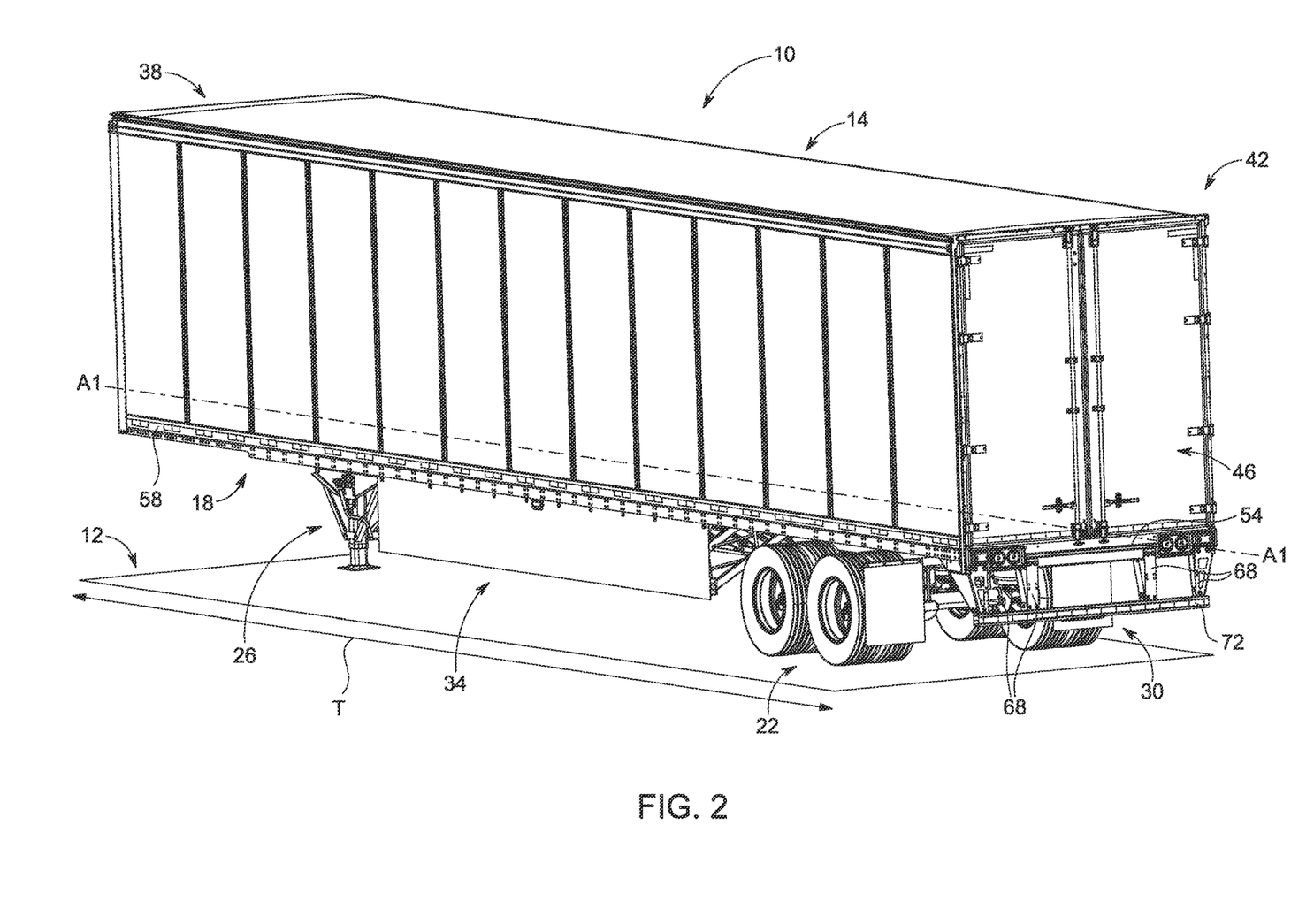
FIG. 2 is a rear perspective view of the cargo transport of FIG. 1.

FIGS. 1-2 illustrate a cargo transport 10 configured for use over a road 12 with a road tractor (e.g., in forming a so-called 18-wheeler) to transport large amounts of cargo. The cargo transport 10 comprises an enclosed cargo container 14, a subframe 18, a plurality of wheels 22, a landing gear assembly 26, a rear underride guard assembly 30, and a side underride guard assembly 34.

FIGS. 1-2 illustrate the enclosed cargo container. The enclosed cargo container 14 stores cargo and includes a front end 38 and a rear end 42. The front end 38 of the enclosed cargo container 14 is adjacent the road tractor when coupled. The rear end 42 includes a cargo opening 46, which can be selectively opened to load or unload cargo from the enclosed cargo container 14. In further embodiments, the cargo transport 10 can alternatively include other types of enclosed or open cargo areas.

Figure 3:
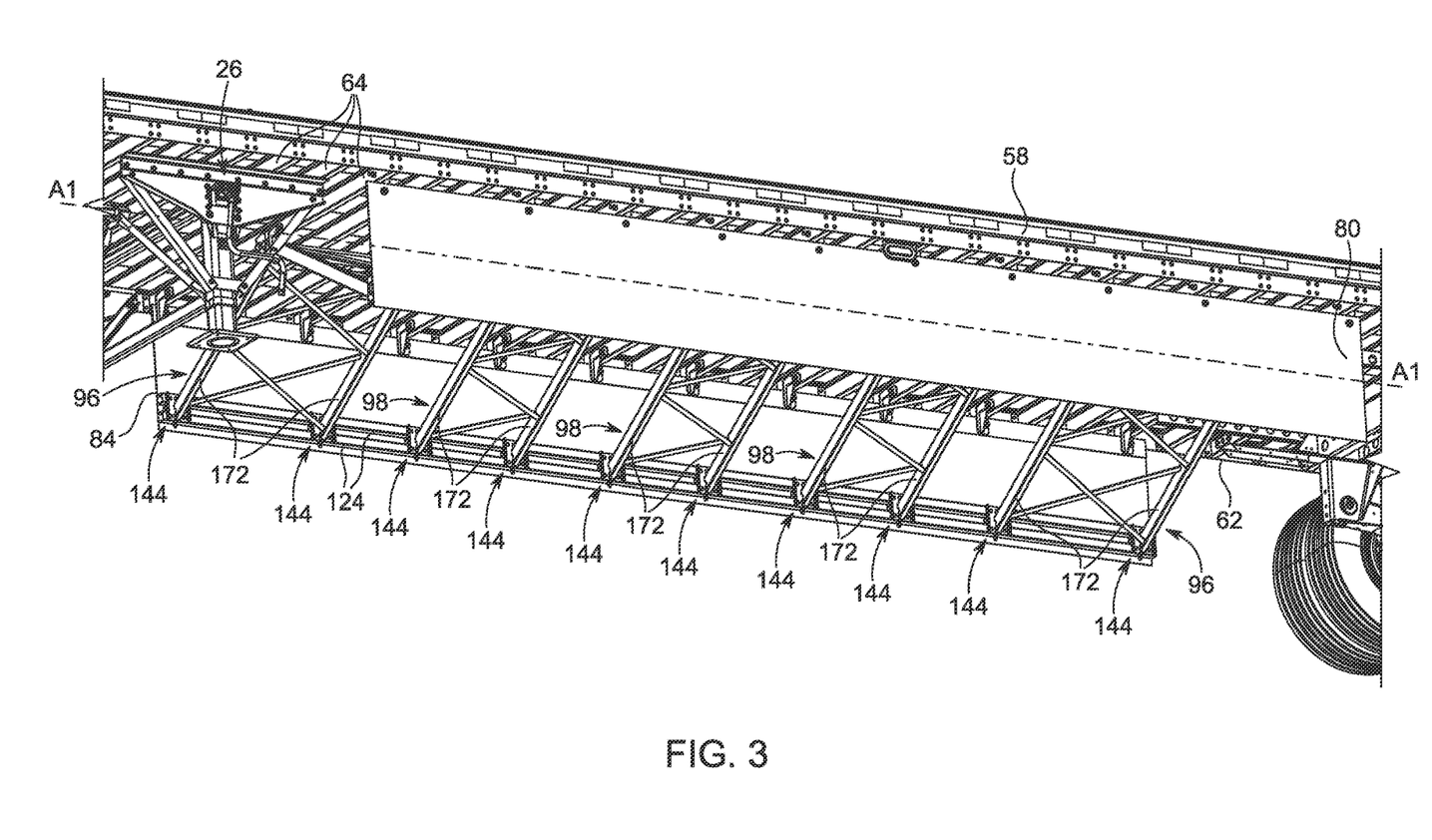
FIG. 3 is a bottom perspective view of the side underride guard.
Figure 4:
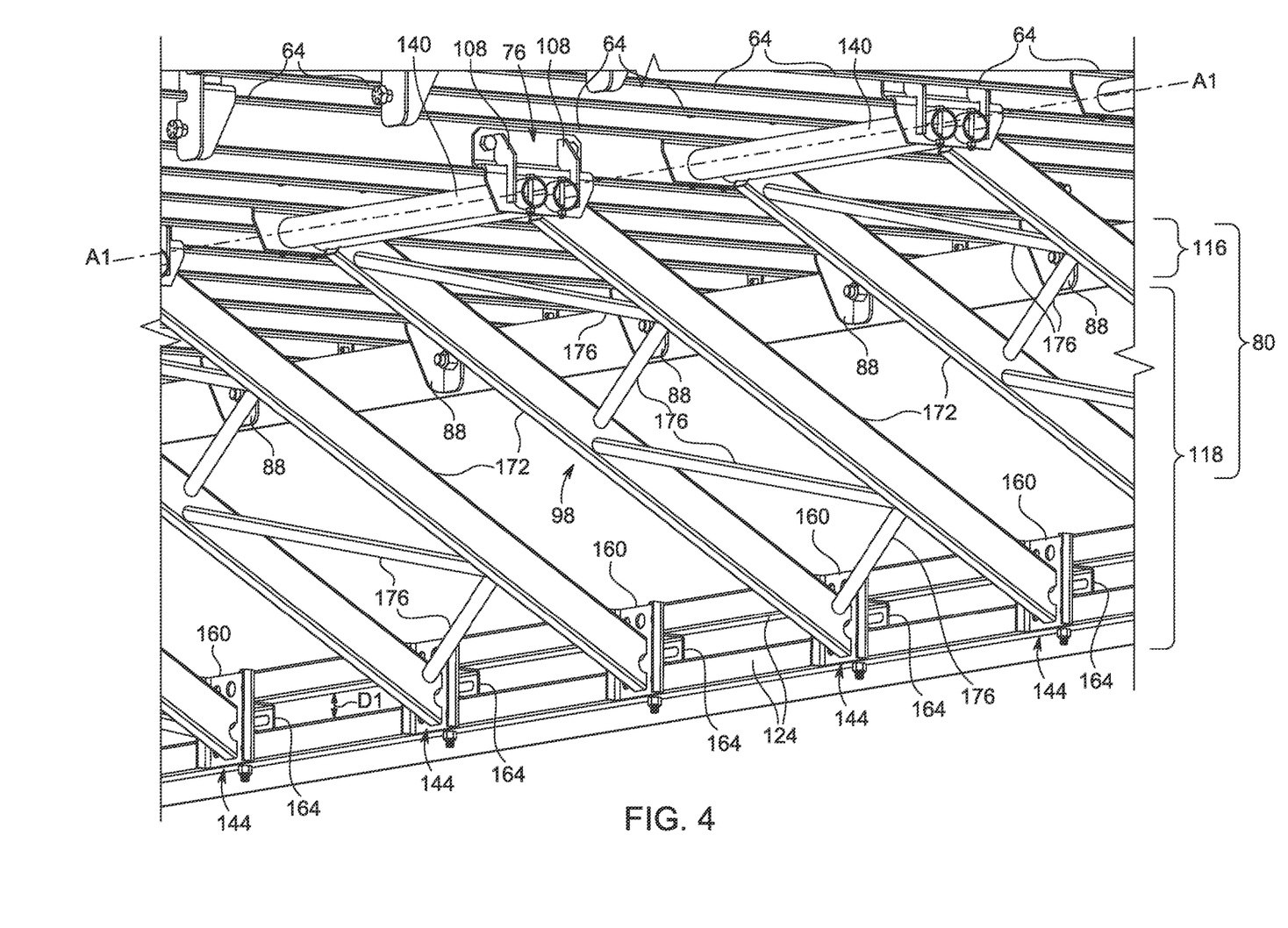
FIG. 4 is a close-up bottom perspective view of a portion of the side underride guard.

As seen in FIGS. 3-4, the subframe 18 is supported above the road 12 by the plurality of wheels 22 and/or the landing gear assembly 26. Additionally, the subframe 18 is configured to receive and support the enclosed cargo container 14. The subframe 18 defines a longitudinal axis A1 passing lengthwise through a center of the subframe 18. The subframe 18 comprises a front rail 50, a rear rail 54 (or "rear bolster"), a road-side longitudinal rail 58, a curb-side longitudinal rail 62, and a plurality of cross beams 64. The front rail 50 is adjacent the front end 38 and the rear rail 54 is adjacent the rear end 42. Both the front rail 50 and the rear rail 54 are orthogonal to the longitudinal axis A1. The road-side longitudinal rail 58 and the curb-side longitudinal rail 62 extend from the front rail 50 to the rear rail 54 and are parallel to the longitudinal axis A1. The terms "road-side" and "curb-side" as applied in the drawings are based on the road tractor and the cargo transport 10 being built for right-lane traffic. This can be reversed for left-lane traffic. The cross beams 64 extend from the road-side longitudinal rail 58 to the curb-side longitudinal rail 62. In the illustrated embodiment, the cross beams 64 are I-beam shaped. The plurality of cross beams 64 are positioned orthogonally to the longitudinal axis A1 and parallel to the front rail 50 and rear rail 54.

As seen in FIGS. 1-2, the plurality of wheels 22 contact the road 12 and are positioned parallel to the road-side longitudinal rail 58 and the curb-side longitudinal rail 62. The wheels 22 provide movement to the cargo transport 10 along the road 12 in a transportation direction T. In the illustrated embodiment, the wheels 22 are located adjacent to the rear end 42 of the cargo transport 10. In other embodiments, some or all of the wheels 22 may be located closer to the front end 50 of the cargo transport 10. In some constructions, some or all of the wheels 22 are adjustable to different positions along the longitudinal axis A1 of the cargo transport 10.

The landing gear assembly 26 is configured to support the cargo transport 10 in a stationary configuration. In the stationary configuration, the cargo transport 10 is not attached to the road tractor and remains motionless. The landing gear assembly 26 extends downward from the plurality of cross beams 64 to the road or other ground surface. In other embodiments, the landing gear assembly 26 may be replaced with another plurality of wheels 22.

As seen in FIG. 2, the rear underride guard assembly 30 is coupled to the rear rail 54 of the subframe 18. The rear underride guard assembly 30 extends from the rear rail 54 towards the road 12 or other ground surface and is configured to substantially inhibit the likelihood for a passenger vehicle to underride the cargo transport 10 in the event of a collision with the rear of the cargo transport 10. The rear underride guard assembly 30 comprises a plurality of vertical posts 68 and a bumper 72 coupled to each of the plurality of vertical posts 68. The bumper 72 is configured to contact the passenger vehicle if the passenger vehicle gets within a distance to the cargo transport 10. As disclosed below, the side underride guard assembly 34 fulfills a similar function, albeit along the sides of the cargo transport 10.

FIGS. 3 and 4 illustrate interior portions of the side underride guard assembly 34. The side underride guard assembly 34 is configured to fill a majority of the longitudinal space between the wheels 22 and the landing gear assembly 26. When the side underride guard assembly 34 is installed to the cargo transport 10, there may be no space for a typical passenger vehicle to pass between the side underride guard assembly 34 and either the wheels 22 or the landing gear assembly 26. The side underride guard assembly 34 is coupled to the cross beams 64 and is positioned on the underside of the subframe 18 between the landing gear assembly 26 and the wheels 22. The side underride guard assembly 34 comprises a plurality of brackets 76, a first resilient sheet 80, a second resilient sheet 84, a plurality of sheet brackets 88, a plurality of first bracing assemblies 96 and a plurality of second bracing assemblies 98. Although the side underride guard assembly 34 is shown and described as providing underride protection on both the road-side and the curb-side, it will be appreciated that the features described and shown herein could be applied to just one side, depending upon regulations and the intended use.

Figure 5:
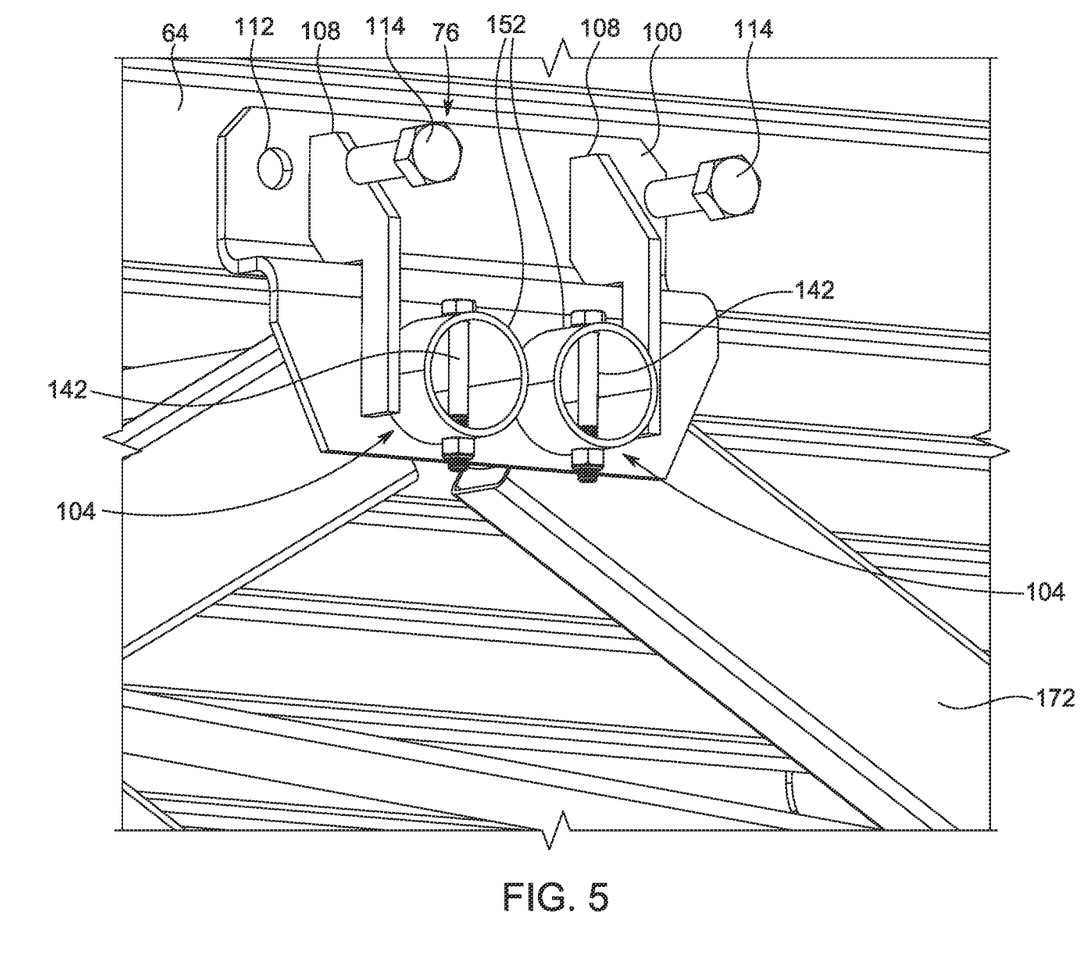
FIG. 5 is a close-up perspective view of a bracket of the side underride guard provided at a central location thereof.

FIG. 5 illustrates a perspective view of one of the brackets 76. The bracket 76 is rigidly coupled to one of the cross beams 64 along the longitudinal axis A1. The bracket 76 provides a rotatable coupling supporting one of the bracing assemblies 96 (e.g., at least one end thereof). The bracket 76 further comprises a bracket body 100, a set of apertures 104, a set of supports 108 (e.g., perpendicular gussets), and a plurality of fastener openings 112. The bracket body 100 is made from sheet metal that has been shaped using a sheet metal bending process to form different portions at different angles with respect to each other. The apertures 104 are configured to receive a portion of the bracing assembly 96. The supports 108 are sheet metal components welded to multiple portions the bracket body 100. The fastener openings 112 are configured to receive a plurality of fasteners 114 to secure the bracket 76 to the cross beam 64. In other embodiments, the bracket 76 may be welded to the cross beam 64, with or without the separate fasteners 114.

FIGS. 3 and 4 show the first resilient sheet 80 and the second resilient sheet 84. The first and second resilient sheets 80, 84 are positioned adjacently and parallel to the road-side longitudinal rail 58 and the curb-side longitudinal rail 62, respectively, and are configured to fill a majority of the open space between the plurality of wheels 22 and the landing gear assembly 26. Additionally, the first and second resilient sheets 80, 84 may improve the aerodynamics of the cargo transport by limiting airflow underneath the cargo transport 10. The first and second resilient sheets 80, 84 are composed of a fiber reinforced plastic and are configured to elastically deform (e.g., by bowing when contacting a raised portion of the road 12). In other embodiments, the first and second resilient sheets 80, 84 may be composed of fiberglass, thermoformed plastic reinforced by carbon or fiberglass, or aluminum. Furthermore, each of the first and second resilient sheets 80, 84 comprises an upper portion 116, a lower portion 118, and a plurality of reinforcement rails 124 (detail shown in FIG. 10). The upper portion 116 is adjacent the subframe 18. The lower portion 118 is positioned below the upper portion 116. In some constructions, the upper portion 116 has a first thickness T1 and the lower portion 118 includes a second thickness T2 less than the first thickness T1. The upper portion 116 has a greater thickness than the lower portion 118 to reduce the risk of tearing near the mounting location of the sheet brackets 88 on the upper portion 116. In other embodiments, the upper portion 116 may comprise additional sheet layers compared to the lower portion 118. In some embodiments, the upper portion 116 may include different material(s) (e.g., having enhanced strength and/or tear resistance) as compared to the lower portion 118, whether or not the upper portion has a greater thickness than the lower portion 118. The plurality of reinforcement rails 124 are coupled to the lower portions 118 of both the first and second resilient sheets 80, 84 through adhesives. In other embodiments, the lower portions 118 are coupled to the plurality of reinforcement rails 124 through a combination of adhesives and mechanical fasteners (e.g., blind rivets). In the illustrated embodiment, one of the reinforcement rails 124 is mounted a vertical distance D1 away from another one of the reinforcement rails 124 on each of the first and second resilient sheets 80, 84. The reinforcement rails 124 are configured to couple to outboard lower portions of the bracing assemblies 96 and increase the stiffness of the resilient sheets 80, 84. In the illustrated embodiment, the reinforcement rails 124 are square tubing, but in other embodiments may be round tubing or one or more sheets of plastic and/or metal. In some embodiments, the lower portion 118 of the first and second resilient sheets 80, 84 extend substantially below the reinforcement rails 124 to further improve the aerodynamics of the cargo transport 10. In these embodiments, the lower portion 118 may elastically deform to overcome road obstacles (curbs, debris, or uneven roads) extending from the road 12.

Figure 6:
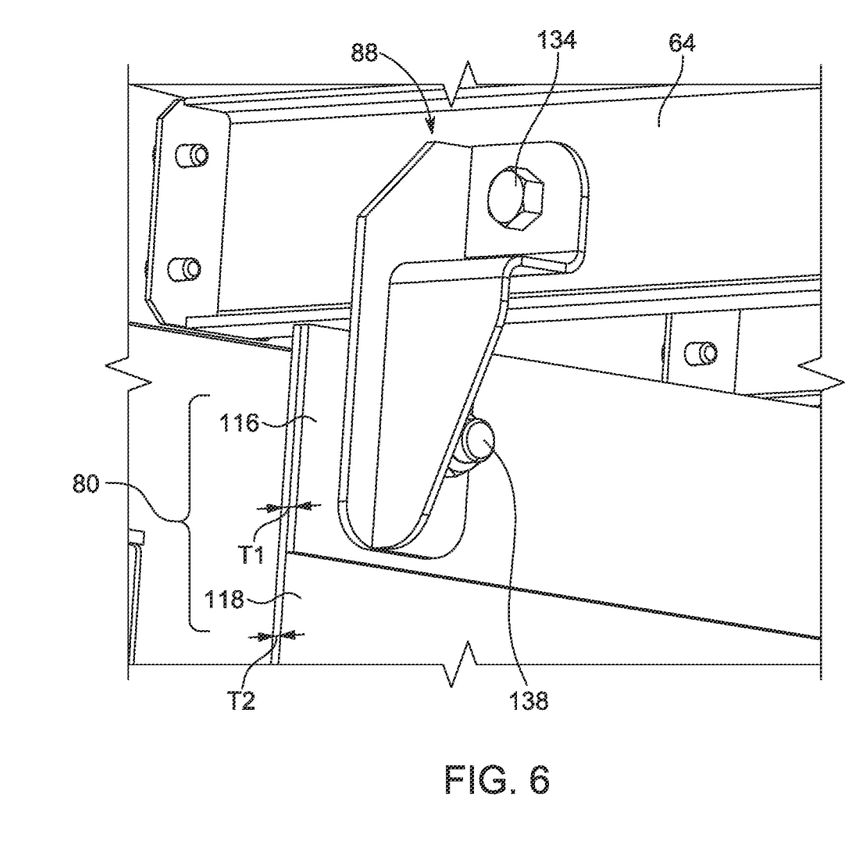
FIG. 6 is a close-up perspective view of a sheet bracket of the side underride guard that is provided at an outboard position thereof and coupled to a cross beam and a first resilient sheet.
Figure 7:
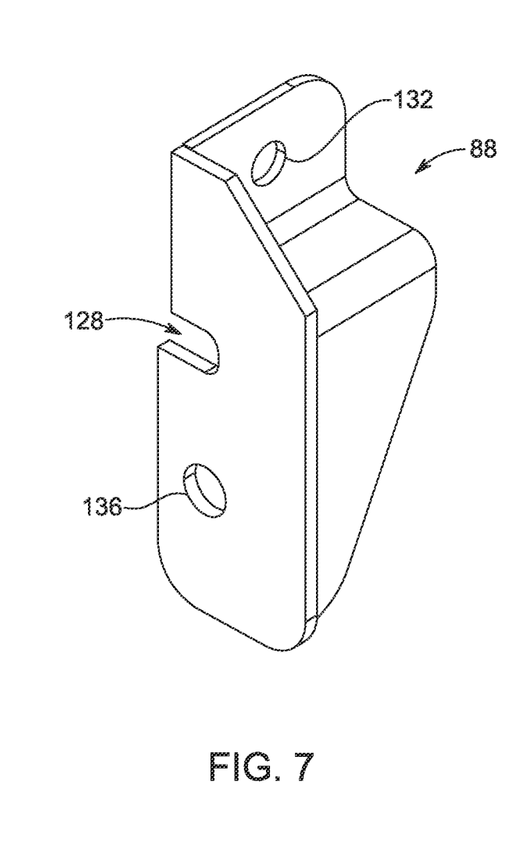
FIG. 7 is another perspective view, showing the sheet bracket removed from the side underride guard.

FIGS. 6 and 7 show one of the sheet brackets 88. The sheet brackets 88 are positioned at both ends of some of the cross beam 64. Each of the sheet brackets 88 is made by joining multiple pieces of sheet metal shaped using a sheet metal bending process. As shown in FIG. 7, the sheet bracket 88 comprises a slot 128, a first fastener opening 132, and a second fastener opening 136. The first opening 132 is configured to receive a fastener 134 to mount the sheet bracket 88 to the cross-beam 64. The second fastener opening 138 is positioned on a face of the sheet bracket 88 orthogonal to the first fastener opening 132 and is configured to receive a fastener 138 to mount to the upper portion 116 of the first resilient sheet 80 or the second resilient sheet 84. The slot 128 is configured to receive a portion of the cross beam 64 and split the load of either one of the resilient sheets 80, 84 with the fastener 134. Additionally, the slot 128 inhibits rotation of the sheet bracket 88 with respect to the cross beam 64.

Figure 11:
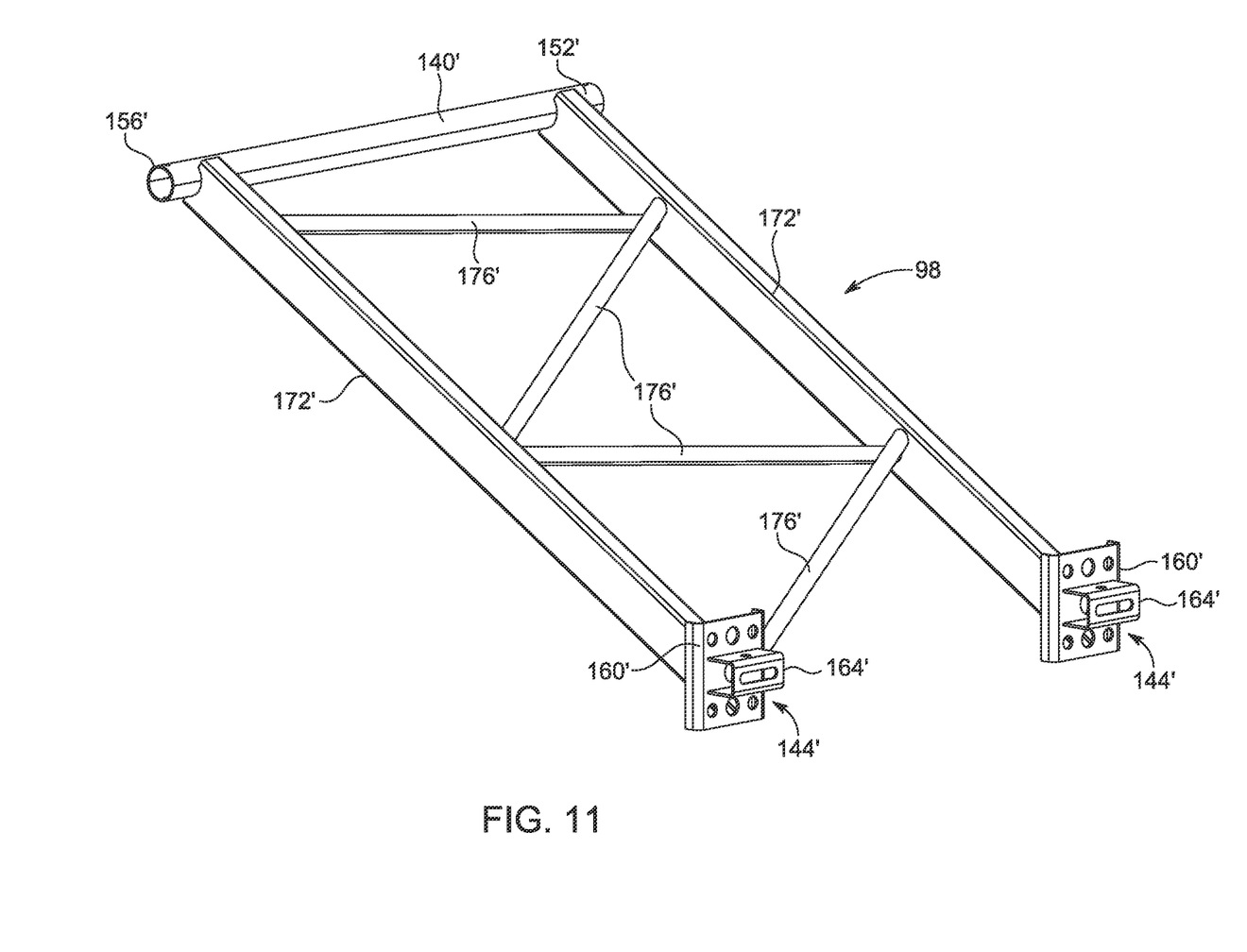
FIG. 11 is a perspective view of a second bracing assembly of the side underride guard.

As shown in FIG. 3, the side underride guard assembly 34 further comprises the plurality of first bracing assemblies 96 (FIG. 8) and the plurality of second bracing assemblies 98 (FIG. 11). In the illustrated embodiment, the side underride guard assembly 34 includes one first bracing assembly 96 at the front of the side underride guard assembly 34 and another first bracing assembly 96 at the rear of the side underride guard assembly 34. Additionally, the side underride guard assembly 34 includes a plurality of (e.g., three of) the second bracing assemblies 98 positioned between the front and rear first bracing assemblies 96. In other embodiments, the position and number of both the first and second bracing assemblies 96, 98 can be differently configured. Both the first and second bracing assemblies 96, 98 extend from the brackets 76 to the reinforcement rails 124 of either the first or second resilient sheets 80, 84.

Figure 8:
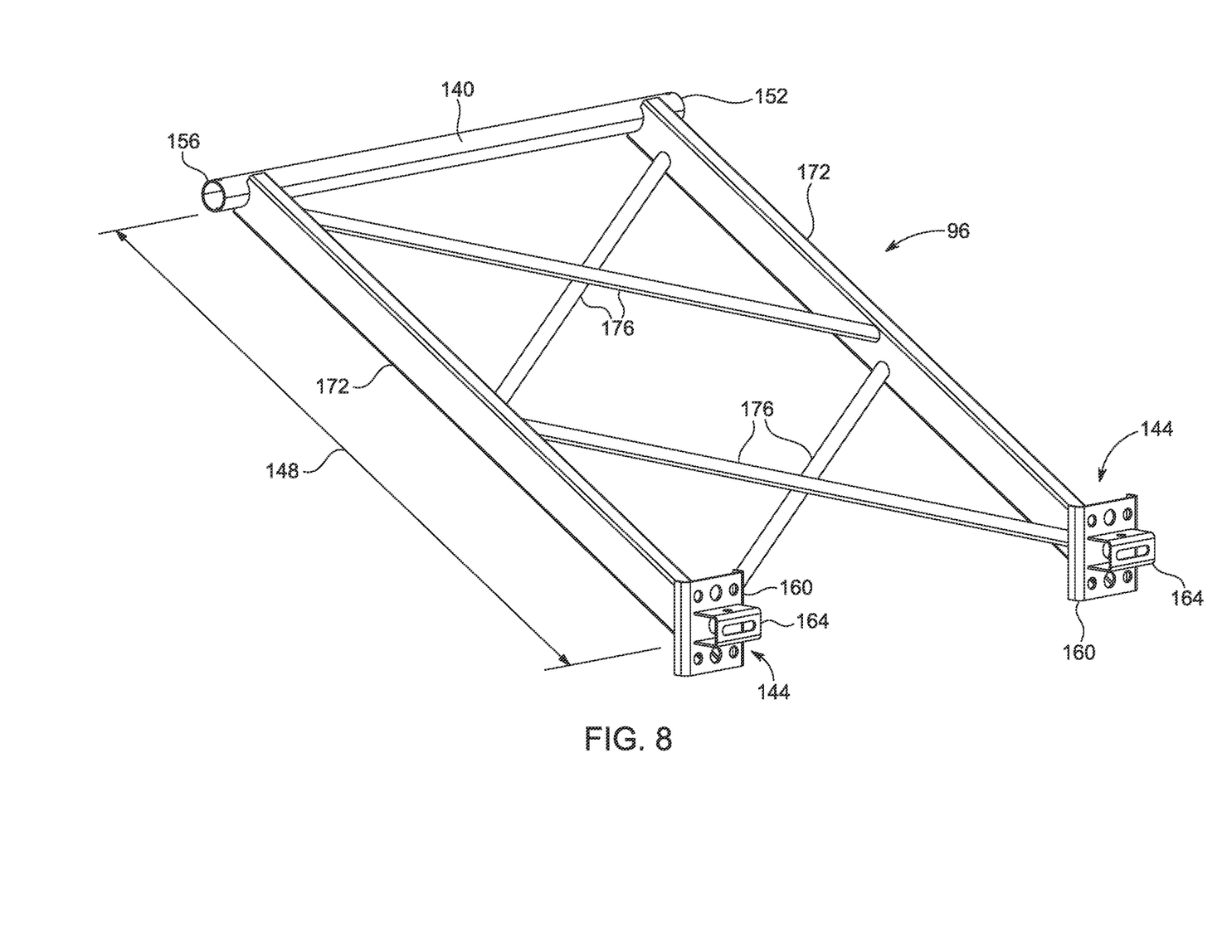
FIG. 8 is a perspective view of a first bracing assembly of the side underride guard.

FIG. 8 shows the first bracing assembly 96. Each bracing assembly 96 is further coupled to more than one bracket 76 spaced along the longitudinal axis A1 and attached to the reinforcement rails 124 in multiple locations spaced along the longitudinal axis A1. The first bracing assembly 96 comprises a shaft portion 140, a plurality of end couplers 144, and a first truss structure 148.

FIG. 8 shows the first truss structure 148. The first truss structure 148 connects the shaft portion 140 to the end couplers 144 and further comprises a plurality of main beams 172 and a plurality of oblique connector beams 176. In the illustrated embodiment, the plurality of main beams 172 are parallel to one another and are made from rectangular tube stock. In other embodiments, the main beams 172 may be made from other shapes of tube stock, solid beams, or plates. The oblique connector beams 176 are made from round tube stock but may be made from other shapes of tube stock, solid beams, or plates in other embodiments. Both ends of the oblique connector beams 176 are welded to the main beams 172 and overlap each other to from an X-shape. The connector beams 176 are configured to reinforce the truss structure 148.

The shaft portion 140 is a tubular member welded to the first truss structure 148 and includes a first end 152 and a second end 156. Both the first and second ends 152, 156 are configured to be received within the apertures 104 of different brackets 76 to form a rotational joint. In the illustrated embodiment, the first and second ends 152, 156 are axially retained in the apertures 104 by a shaft fastener 142 extending through the shaft portion 140, as shown in FIG. 5. In other embodiments, the shaft portion 140 may be axially retained by a spring-loaded pin, a retaining ring, or a rivet.

Figure 9:
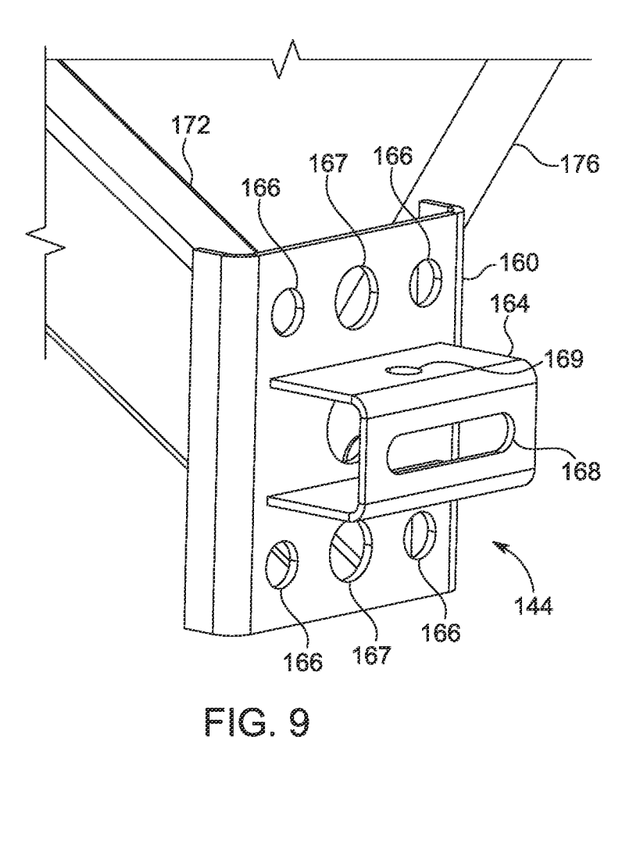
FIG. 9 is a close-up perspective view of an end coupler of the bracing assembly of FIG. 8.
Figure 10:
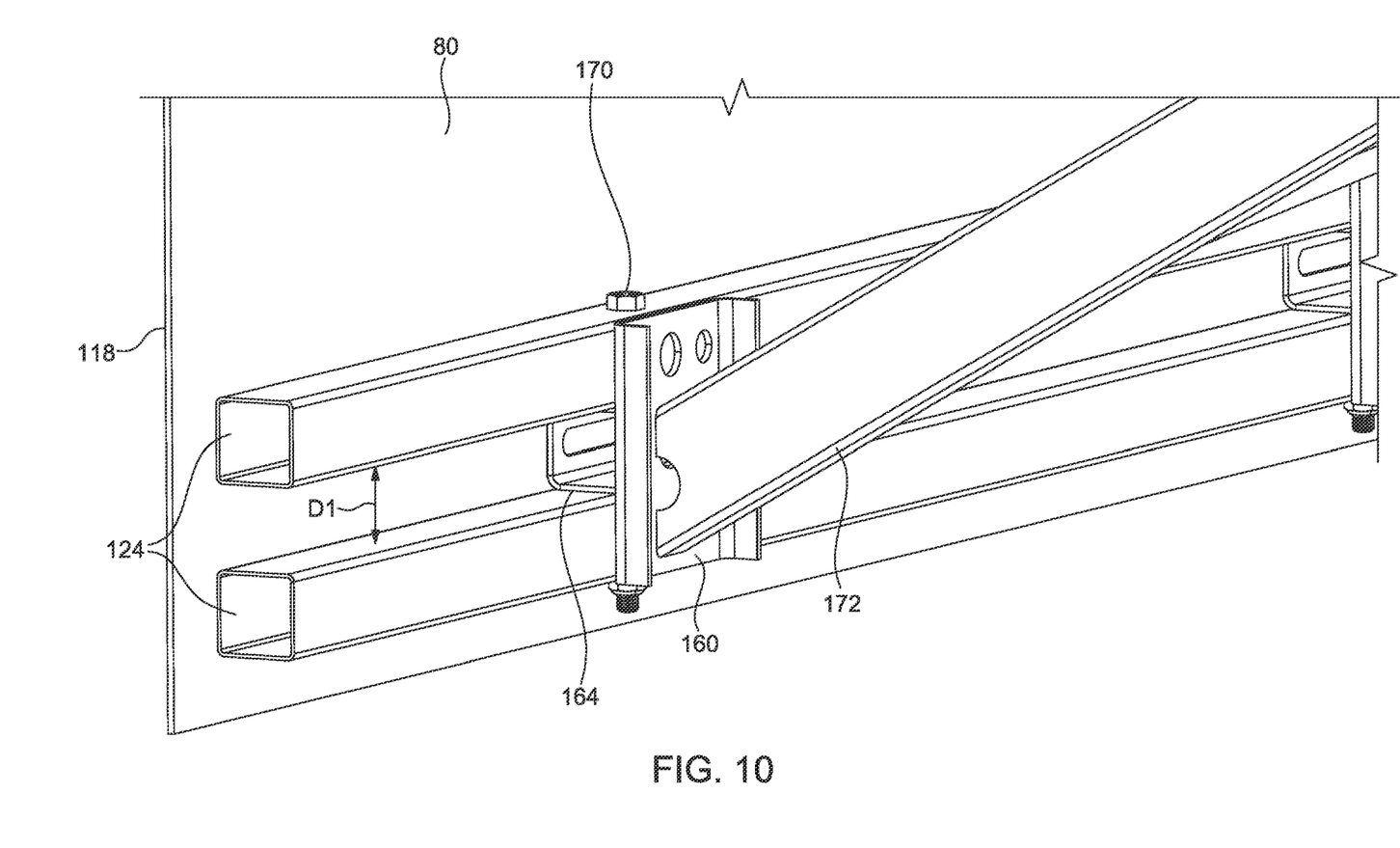
FIG. 10 is a close-up perspective view the end coupler of FIGS. 8 and 9 coupled to the first resilient sheet and a plurality of reinforcement members.

FIGS. 9 and 10 show one of the of end couplers 144 of the bracing assembly 96. In the illustrated embodiment, each of the truss structures 148 includes two end couplers 144 welded to the truss structure 148 on an end opposite to the shaft portion 144. The end couplers 144 are also coupled to the lower portion 118 of either the first resilient sheet 80 or the second resilient sheet 84 and reinforcement rails 124. As shown in FIG. 9, the end coupler 144 includes a plate 160 and a support bracket 164. The plate 160 includes a plurality of weight relief apertures 166, 167 configured to reduce the weight of the plate 160. As shown in FIG. 10, the support bracket 164 is elongated in a direction parallel to the longitudinal axis A1. The support bracket 164 is positioned between the reinforcement rails 124 in the space defined by distance D1 and is secured to the reinforcement rails 124 by a fastener 170 extending through both reinforcement rails 124 and the support bracket 164. The support bracket 164 abuts either the first resilient sheet 80 or the second resilient sheet 84 and receives one or more fasteners (not shown) that extend through either sheet 80, 84 in a fastener receiving slot 168.

FIG. 11 shows the second bracing assembly 98. The second bracing assembly 98 comprises a shaft portion 140', a plurality of end couplers 144', and a truss structure 148'. The shaft portion 140' is a tubular member configured to be received within the apertures 104 of the bracket 76 to form a rotational joint. The shaft portion 140' is coupled to an end of the truss structure 148' through welding. The end couplers 144' is welded to an opposing end of the truss structure 148' and is configured to couple to the reinforcement members 124 and the resilient sheets 80, 84. The truss structure 148' comprises a plurality of main beams 172' and a plurality of oblique connector beams 176'. In the illustrated embodiment, the plurality of main beams 172' of the second bracing assembly 98 are parallel to one another and are spaced closer to one another than the main beams 172 of the first bracing assembly 96. The oblique connector beams 176' of the second bracing assembly 98 are welded to both of the main beams 172' to form a "zig-zag" shape.

Figure 12:
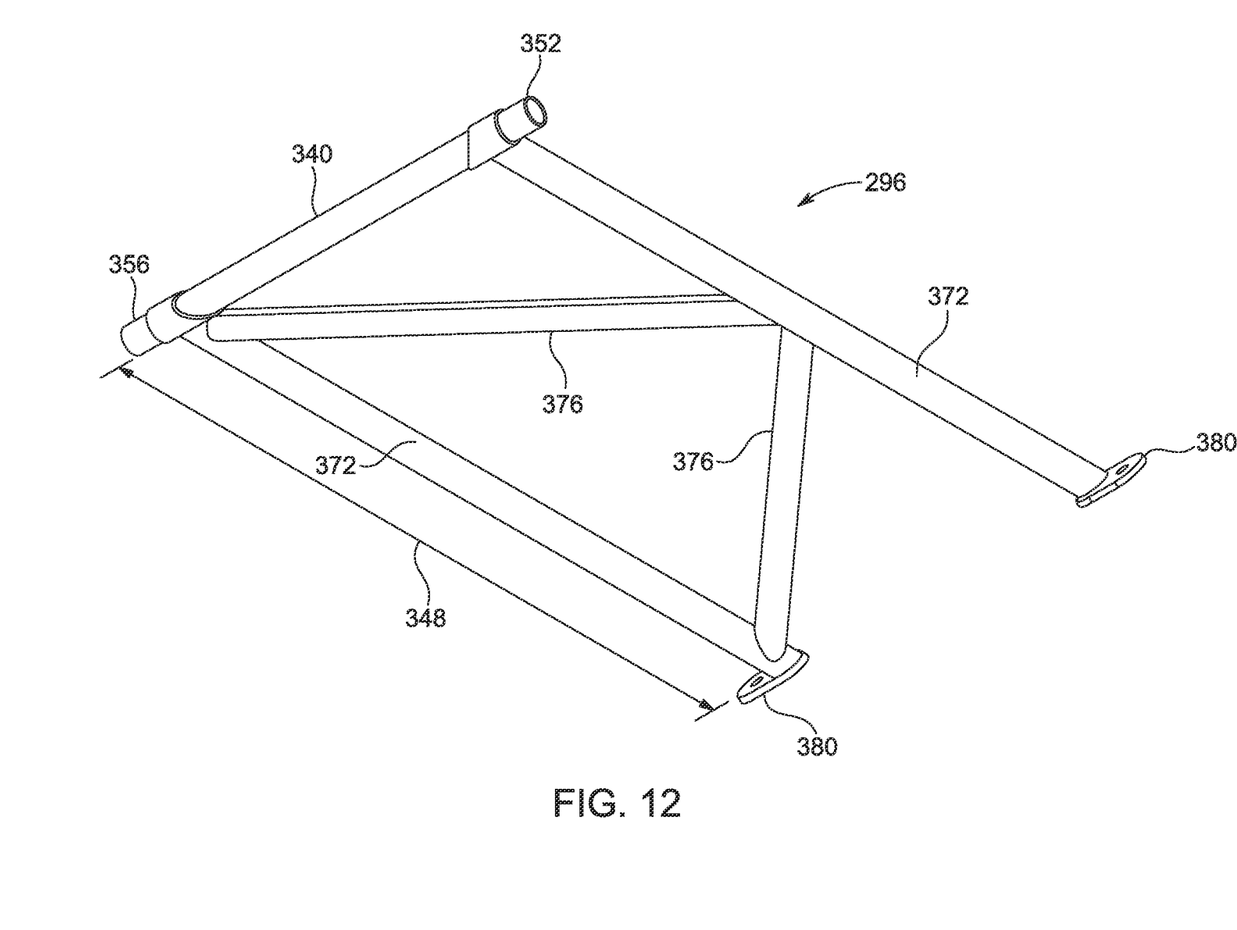
FIG. 12 is a perspective view of an alternate embodiment of the first bracing assembly.

FIG. 12 shows an alternate embodiment of a first bracing assembly 296, which comprises a shaft portion 340, a plurality of end plates 380, and a truss structure 348. The shaft portion 340 includes a first end 352 and a second end 356, which are configured to be received with the apertures 104 of the brackets 76. The end plates 380 are configured to abut the first resilient sheet 80 or the second resilient sheet 84 and can receive a fastener (not shown) extending through either one of the sheets 80, 84 into the end plate 380. The truss structure 348 couples the shaft portion 340 to the end plates 380 and comprises a plurality of main beams 372 and a plurality of oblique connector beams 376. The main beams 372 are generally parallel to one another. In the illustrated embodiment, the main beams 372 are formed of round tube stock material. The oblique connector beams 376 extend from one of the main beams 372 to another one of the main beams 372, without overlapping each other, to form a V-shape. In the illustrated embodiment, the main beams 372 are also formed of round tube stock material. In the illustrated embodiment, all the components of the first bracing assembly 296 are welded to one another. The differences of the alternate embodiment of the first bracing assembly 296 can also be applied to construct an alternate embodiment of a second bracing assembly.

In operation, the side underride guard assembly 34 is coupled to the subframe 18 of the cargo transport 10. If a passenger vehicle travels on a path that intersects the side underride guard assembly 34 from either the road-side or the curb-side, the passenger vehicle contacts and applies a force to one of the resilient sheets 80, 84. The force applied by the passenger vehicle is transferred from one of the resilient sheets 80, 84 to the bracing assemblies 96, 98 and into the brackets 76 and sheet brackets 88. The resilient sheet 80, 84 that is impacted is loaded vertically in tension while the bracing assemblies 96, 98 are loaded in compression. The bracing assemblies 96, 98 transfer loads into the subframe cross beams 64 via the respective brackets 76. Thus, the likelihood for side underride of the passenger vehicle is greatly reduced, without resorting to large, heavy, rigid (e.g., metal) framing constructed along the outboard edges of the cargo transport 10. Despite their effectiveness, such designs negatively impact fuel efficiency during the full operating life of the cargo transport and reduce the ground clearance, which has generally kept them from widespread adoption.

What is claimed is:

1. A cargo transport comprising:
    a plurality of wheels configured to provide movement of the cargo transport along a road in a transportation direction parallel to a longitudinal axis of the cargo transport;
    a subframe supported above the road by the plurality of wheels and comprising a road-side longitudinal rail, a curb-side longitudinal rail, a front rail, a rear rail, and a plurality of cross beams extending between the road-side longitudinal rail and the curb-side longitudinal rail and spaced from the front and rear rails;
    an enclosed cargo container coupled to the subframe, the enclosed cargo container defining a front end and a rear end including a cargo opening;
    a landing gear assembly coupled to the subframe, the landing gear assembly configured to support a front end of the cargo transport in a stationary configuration;
    an underride guard assembly coupled to the subframe, the underride guard assembly positioned below the enclosed cargo container and between the plurality of wheels and the set of landing gear, the underride guard assembly comprising
    a plurality of brackets coupled to the plurality of cross beams of the subframe, the plurality of brackets located along the longitudinal axis,
    a first resilient sheet coupled to the subframe with a first plurality of sheet brackets, the first resilient sheet located adjacent to the road-side longitudinal rail, wherein a first reinforcement rail is coupled to a lower portion of the first resilient sheet,
    a second resilient sheet coupled to the subframe with a second plurality of sheet brackets, the second resilient sheet located adjacent to the curb-side longitudinal rail, wherein a second reinforcement rail is coupled to a lower portion of the second resilient sheet, and
    a plurality of bracing assemblies including at least one bracing assembly coupled between the plurality of brackets and the first reinforcement rail and at least one bracing assembly coupled between the plurality of brackets and the second reinforcement rail, each of the plurality of bracing assemblies comprising:
        a shaft portion rotatably coupled to the plurality of brackets,
        a plurality of end couplers coupled to one of the first and second reinforcement rails, and
        a truss structure spanning from the shaft portion to the plurality of end couplers.

2. A cargo transport comprising:
    a plurality of wheels configured to provide movement of the cargo transport along a road in a transportation direction parallel to a longitudinal axis of the cargo transport;
    a subframe supported above the road by the plurality of wheels and comprising a road-side longitudinal rail, a curb-side longitudinal rail, and a plurality of cross beams extending between the road-side longitudinal rail and the curb-side longitudinal rail; and
    an underride guard assembly coupled to the subframe, the underride guard assembly comprising:
        a plurality of brackets coupled to the plurality of cross beams of the subframe, the plurality of brackets located centrally on the plurality of cross beams of the subframe,
        a plurality of resilient sheets including a road-side resilient sheet coupled to the subframe and extending below the road-side longitudinal rail and a curb-side resilient sheet coupled to the subframe and extending below the curb-side longitudinal rail,
        at a lower portion of each one of the plurality of resilient sheets, a respective reinforcement rail is coupled to the resilient sheet, and
        a plurality of bracing assemblies including a bracing assembly rotatably coupled to the plurality of brackets and the respective reinforcement rail on the road-side resilient sheet and a bracing assembly coupled to the plurality of brackets and the respective reinforcement rail on the curb-side resilient sheet,
    wherein each of the bracing assemblies comprises:
        a shaft portion rotatably coupled to the plurality of brackets,
        a plurality of end couplers coupled to the respective reinforcement rail at one of the plurality of resilient sheets, and
        a truss structure spanning from the shaft portion to the plurality of end couplers.

3. The cargo transport of claim 2, further comprising an enclosed cargo container supported by the subframe.

4. The cargo transport of claim 2, wherein the truss structure is constructed as a plurality of parallel main beams and a plurality of oblique connector beams coupled between the plurality of parallel main beams.

5. The cargo transport of claim 4, wherein the plurality of oblique connector beams overlap one another in an X pattern.

6. The cargo transport of claim 2, wherein the shaft portion of each of the plurality of bracing assemblies comprises a first end received in an opening of one of the plurality of brackets and a second end received in an opening of another one of the plurality of brackets.

7. A cargo transport comprising:
   a plurality of wheels configured to provide movement of the cargo transport along a road in a transportation direction parallel to a longitudinal axis of the cargo transport;
   a subframe supported above the road by the plurality of wheels and comprising a road-side longitudinal rail, a curb-side longitudinal rail, and a plurality of cross beams extending between the road-side longitudinal rail and the curb-side longitudinal rail; and
   an underride guard assembly coupled to the subframe, the underride guard assembly comprising:
      a plurality of brackets coupled to the plurality of cross beams of the subframe, the plurality of brackets located centrally on the plurality of cross beams of the subframe,
      a plurality of resilient sheets including a road-side resilient sheet coupled to the subframe and extending below the road-side longitudinal rail and a curb-side resilient sheet coupled to the subframe and extending below the curb-side longitudinal rail,
      at a lower portion of each one of the plurality of resilient sheets, a respective reinforcement rail is coupled to the resilient sheet, and
      a plurality of bracing assemblies including a bracing assembly rotatably coupled to the plurality of brackets and the respective reinforcement rail on the road-side resilient sheet and a bracing assembly coupled to the plurality of brackets and the respective reinforcement rail on the curb-side resilient sheet,
   wherein a plurality of sheet brackets is coupled to the plurality of cross beams and coupled to the plurality of resilient sheets at respective upper portions of the plurality of resilient sheets.

8. A cargo transport comprising:
   a plurality of wheels configured to provide movement of the cargo transport along a road in a transportation direction parallel to a longitudinal axis of the cargo transport;
   a subframe supported above the road by the plurality of wheels and comprising a road-side longitudinal rail, a curb-side longitudinal rail, and a plurality of cross beams extending between the road-side longitudinal rail and the curb-side longitudinal rail;
   an underride guard assembly coupled to the subframe, the underride guard assembly comprising:
      a plurality of brackets coupled to the plurality of cross beams of the subframe, the plurality of brackets located centrally on the plurality of cross beams of the subframe,
      a plurality of resilient sheets including a road-side resilient sheet coupled to the subframe and extending below the road-side longitudinal rail and a curb-side resilient sheet coupled to the subframe and extending below the curb-side longitudinal rail,
      at a lower portion of each one of the plurality of resilient sheets, a respective reinforcement rail is coupled to the resilient sheet, and
      a plurality of bracing assemblies including a bracing assembly rotatably coupled to the plurality of brackets and the respective reinforcement rail on the road-side resilient sheet and a bracing assembly coupled to the plurality of brackets and the respective reinforcement rail on the curb-side resilient sheet,
   wherein each of the plurality of bracing assemblies is coupled to the respective reinforcement rail at more than one location, and
   wherein another respective reinforcement rail is coupled to each of the resilient sheets and is spaced vertically apart from the respective reinforcement rail and wherein the vertical space between each of the respective reinforcement rails receives a support bracket of an end coupler of the bracing assembly.

9. An underride guard assembly for use with a cargo transport having a subframe with a plurality of transverse cross beams bisected by a longitudinal axis, the underride guard assembly comprising:
   a plurality of brackets configured for securement to the subframe at the longitudinal axis;
   a resilient sheet configured for securement to the subframe along one of a road-side or a curb-side thereof;
   a reinforcement rail coupled to a lower portion of the resilient sheet;
   a plurality of bracing assemblies coupled to the plurality of brackets and the reinforcement rail; and
   an additional reinforcement rail coupled to the lower portion of the resilient sheet and spaced vertically from the reinforcement rail.

10. The underride guard assembly of claim 9, wherein each of the plurality of bracing assemblies comprises:
    a shaft portion rotatably coupled to the plurality of brackets,
    a plurality of end couplers coupled to the reinforcement rail, and
    a truss structure spanning from the shaft portion to the plurality of end couplers.

11. The underride guard assembly of claim 10, wherein the truss structure is constructed as a plurality of parallel main beams and a plurality of oblique connector beams coupled between the plurality of parallel main beams.

12. The underride guard assembly of claim 11, wherein the plurality of oblique connector beams overlap one another in an X pattern.

13. The underride guard assembly of claim 10, wherein the shaft portion comprises a first end received in an opening of one of the plurality of brackets and a second end received in an opening of another one of the plurality of brackets.

14. The underride guard assembly of claim 10, further comprising a plurality of sheet brackets configured to secure an upper portion of the resilient sheet to the subframe.

15. The underride guard assembly of claim 10, wherein each of the plurality of bracing assemblies is coupled to the reinforcement rail at more than one location.

16. An underride guard assembly for use with a cargo transport having a subframe with a plurality of transverse cross beams bisected by a longitudinal axis, the underride guard assembly comprising:
    a plurality of brackets configured for securement to the subframe at the longitudinal axis;
    a resilient sheet configured for securement to the subframe along one of a road-side or a curb-side thereof;
    a reinforcement rail is coupled to a lower portion of the resilient sheet;
    a plurality of bracing assemblies coupled to the plurality of brackets and the reinforcement rail;
    a second resilient sheet configured for securement to the subframe along the other of the road-side and the curb-side;

a second reinforcement rail coupled to a lower portion of the second resilient sheet; and a second plurality of bracing assemblies coupled to the second reinforcement rail and configured to extend toward the subframe.

17. The underride guard assembly of claim 16, wherein each of the plurality of brackets includes a first portion supporting one of the plurality of bracing assemblies and a second portion supporting one of the second plurality of bracing assemblies.

* * * * *